3,305,313
METHOD OF PRODUCING GALLIUM PHOSPHIDE
IN CRYSTALLINE FORM
Valdeko H. Sirgo, Elkins Park, and John L. Richards, Norristown, Pa., assignors to Philco-Ford Corporation, a corporation of Delaware
Filed Dec. 18, 1963, Ser. No. 331,479
5 Claims. (Cl. 23—204)

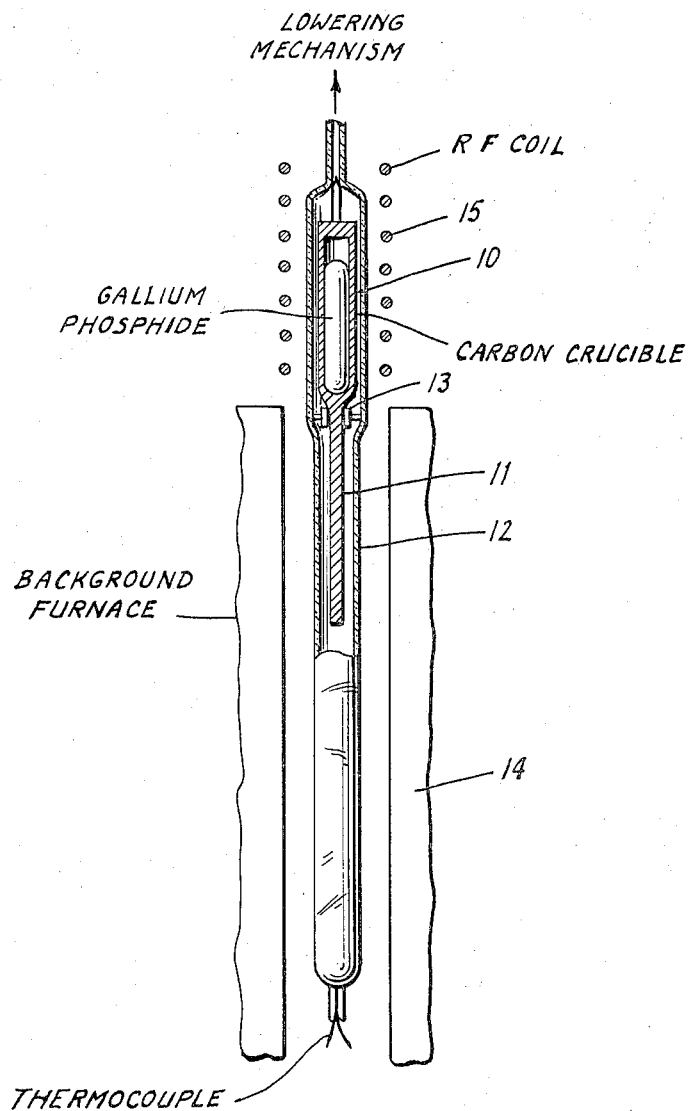

This invention relates to the formation of gallium phosphide crystals. More particularly, the invention relates to the formation of such crystals by bringing vaporized phosphorus into association with gallium at a high reaction temperature and for a time sufficient to form gallium phosphide, and then gradually cooling the gallium phosphide to cause it to crystallize.

Prior methods of thus producing gallium phosphide in crystalline form generally have involved high vapor pressures (e.g., 20 to 60 atmospheres) with consequent danger of explosion.

The principal object of the present invention is to provide a highly efficient method which does not involve high vapor pressures and is therefore substantially free of any danger of explosion.

In accordance with this invention, a predetermined quantity of gallium is completely enclosed within a crucible which is porous to vaporized phosphorus, the crucible is then subjected to an atmosphere of vaporized phosphorus at an ambient temperature and for a time interval sufficient to produce gallium phosphide within said crucible, and finally the crucible is subjected to a lower ambient temperature to cause crystallization of the gallium phosphide.

In the preferred embodiment hereinafter described, phosphorus is placed in one part of a vessel and the gallium-containing crucible is placed in another part of said vessel, the vessel is evacuated and sealed, the two parts of the vessel are subjected respectively to relatively low and high temperatures to cause the phosphorus to diffuse through the wall of the crucible and to effect the reaction which produces gallium phosphide, and finally the vessel is slowly moved so as to move the crucible out of the high temperature zone and into the lower temperature zone, thereby causing the gallium phosphide within the crucible to crystallize.

The invention may be fully understood from the following detailed description with reference to the accompany drawing, the single figure of which is a schematic illustration which will enable a clear understanding of the method provided by the invention.

Referring more particularly to the drawing, a crucible 10 is employed which is formed of a material, such as carbon or graphite, that is porous to vaporized phosphorus. This crucible is preferably of cylindrical form, and for a purpose hereinafter described it may have a tail-like solid extension 11. At the start of the process, gallium metal is placed in the crucible to about one-third the depth thereof.

An elongate vessel 12 is also employed which may be formed of quartz. Into the lower part of this vessel is distilled phosphorus in an amount in excess of stoichiometric proportions. The gallium-containing crucible is placed in the upper part of the vessel 12 which may have internal supports 13 to hold the crucible. The vessel 12 is evacuated and sealed.

This assemblage is now placed in a two-temperature furnace as shown in the drawing, with the lower part of vessel 12 containing the phosphorus within the main body 14 of the furnace where it is subjected to a relatively low temperature (e.g., 415° C.) controlled by a thermocouple, and with the upper part of the vessel 12 containing the crucible within a radio frequency heating coil 15 where it is subjected to a relatively high temperature (e.g., 1350° C.). With the temperature as stated, by way of example, a background vapor pressure of the phosphorus inside the closed vessel of 1.1 atmospheres is maintained. This is in sharp contrast to the dangerously high vapor pressures of prior methods. The phosphorus diffuses through the wall of the crucible 10 and the reaction takes place therein which forms gallium phosphide.

After a time interval (e.g., an hour) sufficient to produce gallium phosphide within the crucible 10, vessel 12 is slowly lowered by suitable lowering mechanism, e.g., at a rate of 3.6 cm. per hour, to effect gradual cooling and crystallization of the gallium phosphide. With the temperature in the reaction zone sufficiently high, the time interval to allow for formation of gallium phosphide is not critical.

Experimentation has shown that with the method of this invention ingots of gallium phosphide of dimensions 1 cm. in diameter by 10 cms. in length can be formed consistently.

The purpose of the optional tail-like extension 11 can now be appreciated. The crystal growth is self-nucleated, and the extension 11 acts as a heat sink to lower the temperature and to insure that the self-seeded crystal nucleation shall take place at the bottom end of the crucible. Thus the nucleation is controlled and stray nucleation is effectively prevented.

While the invention has been described with reference to a specific embodiment, it will be understood that the invention is not limited thereto but contemplates such modifications and further embodiments as may occur to those skilled in the art.

We claim:
1. A method of producing crystalline gallium phosphide by reaction of gallium with phosphorus vapor and gradual cooling of said gallium phosphide formed by said reaction, even when said phosphorus vapor has a relatively low vapor pressure during both said reaction and said cooling, said method comprising the successive steps of:
   positioning a quantity of phosphorus within one part of an evacuable vessel,
   positioning in a different part of said vessel a crucible which is permeable to phosphorus vapor and completely encloses a quantity of gallium,
   evacuating said vessel and sealing said evacuated vessel,
   establishing said phosphorus at a first temperature to produce within said vessel phosphorus vapor having a vapor pressure sufficient to pass phosphorus vapor through said crucible into contact with gallium therewithin,
   concurrently establishing said gallium at a second temperature sufficiently high for formation of gallium phosphide within said crucible by reaction between gallium within said crucible and phosphorus contacting the latter gallium,
   maintaining at said first temperature said phosphorus positioned within said one part of said vessel and concurrently maintaining said gallium at said second temperature, for a time sufficient for gallium phosphide to form by reaction within said crucible, and gradually cooling said crucible to crystallize said gallium phosphide formed therewithin.

2. A method according to claim 1, wherein said crucible is composed of carbon.

3. A method according to claim 1, wherein said first temperature is substantially lower than said second temperature, and said cooling step comprises gradually cooling successive portions of said gallium phosphide formed within said crucible.

4. A method according to claim 1, wherein said first temperature is about 415° C., said second temperature is about 1350° C., and said vapor pressure is about 1.1 atmospheres.

5. A method according to claim 4, wherein said crucible is composed of graphite.

References Cited by the Examiner

UNITED STATES PATENTS 2,871,100  1/1959  Guire et al. _____ 23—204

OTHER REFERENCES

Lowry: "Inorganic Chemistry," 2nd ed., Macmillan and Co., Limited, London, 1931, p. 16, last paragraph.

OSCAR R. VERTIZ, *Primary Examiner.*

H. S. MILLER, *Assistant Examiner.*